United States Patent [19]

Baldeck

[11] Patent Number: 5,215,233

[45] Date of Patent: * Jun. 1, 1993

[54] BICYCLE CARRIER FOR VEHICLES

[76] Inventor: Robert J. Baldeck, 2006 Colton Dr., Orlando, Fla. 32822

[*] Notice: The portion of the term of this patent subsequent to Aug. 1, 2008 has been disclaimed.

[21] Appl. No.: 539,354

[22] Filed: Jul. 16, 1990

Related U.S. Application Data

[60] Division of Ser. No. 207,911, Jun. 13, 1988, Pat. No. 5,038,980, which is a continuation of Ser. No. 902,978, Sep. 2, 1986.

[51] Int. Cl.⁵ .................................................. B60R 9/10
[52] U.S. Cl. ........................ 224/42.03 B; 224/330; 224/309
[58] Field of Search .............. 224/42.03 A, 42.03 B, 224/42.03 R, 42.12, 42.15, 42.18, 42.26, 42.39, 309, 314, 324, 329, 330, 901

[56] References Cited

U.S. PATENT DOCUMENTS

| | | | |
|---|---|---|---|
| 1,321,794 | 11/1919 | Scherff | 224/42.26 |
| 2,576,222 | 11/1951 | Hill | 224/42.03 B |
| 3,923,220 | 12/1975 | Marcyan | 224/42.03 B |
| 3,923,221 | 12/1975 | Ballinger | 224/42.03 B |
| 3,927,810 | 12/1975 | Danon | 224/314 |
| 3,927,811 | 12/1975 | Nussbaum | 224/42.03 B |
| 4,332,337 | 6/1982 | Kosecoff | 224/42.03 B |
| 4,640,332 | 2/1987 | Turner | 160/46 |
| 4,759,963 | 7/1988 | Uso, Jr. et al. | 224/901 X |
| 4,874,151 | 10/1989 | Fritz | 224/901 X |

Primary Examiner—Henry J. Recla
Assistant Examiner—Casey Jacyna
Attorney, Agent, or Firm—Edward M. Livingston

[57] ABSTRACT

A compact carrier for transporting bicycles or lightweight motorcycles on the rear or front bumper of a vehicle, which consists primarily of a set of straps with buckles holding the bicycle or motorcycle under tension while being supported by and resting on the bumper. One embodiment of the carrier utlizes a single strap, secured to an automobile at one end to the trunk or hood and the other end to the bumper by L-shaped buckles. The body of the bicycle is secured in the desired position by a loop on the main strap which wraps around the bicycle crossbar. This strap is adjustable to fit almost any size bicycle by a buckle in the middle thereof. A second embodiment of bicycle carrier uses a pair of V-straps secured by L-shaped buckles to either the trunk or hood and to the bumper which extend in an open V-shape to attach to the handle bar stem and the seat post of the bicycle. Another third embodiment provides in combination a telescoping rod and straps to hold the bicycle body in place. For use in combination with these carriers, loops and extruded pieces are provided to keep the bicycle tires in place on the vehicle bumpers.

13 Claims, 4 Drawing Sheets

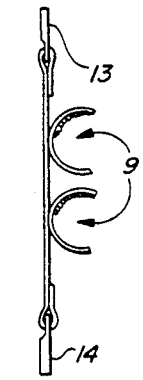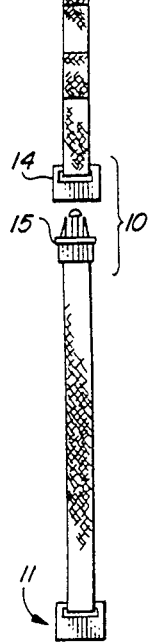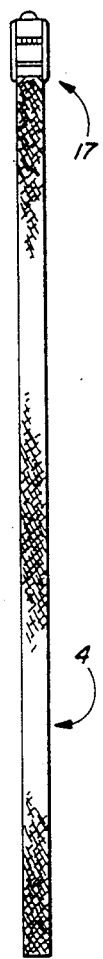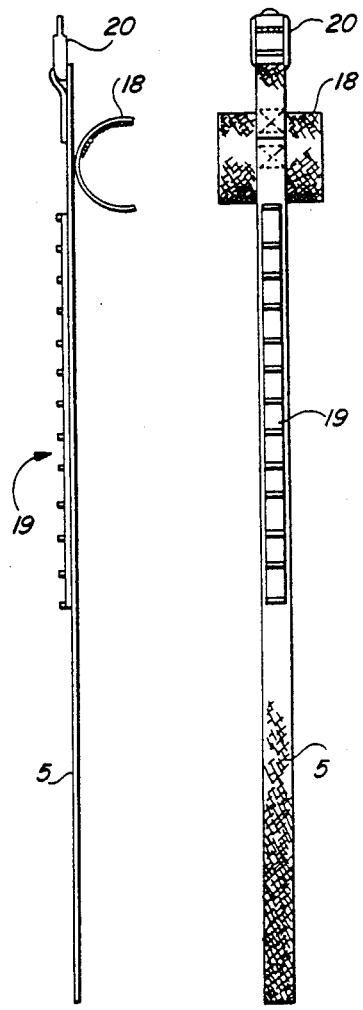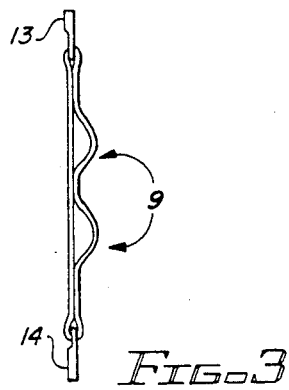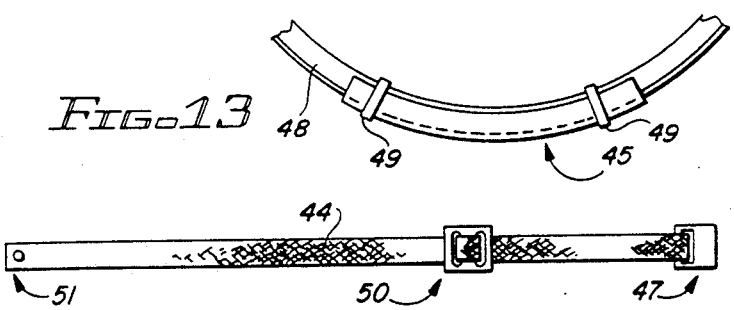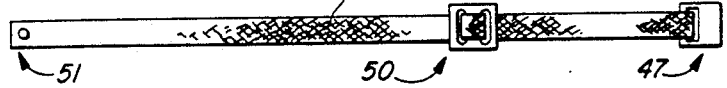

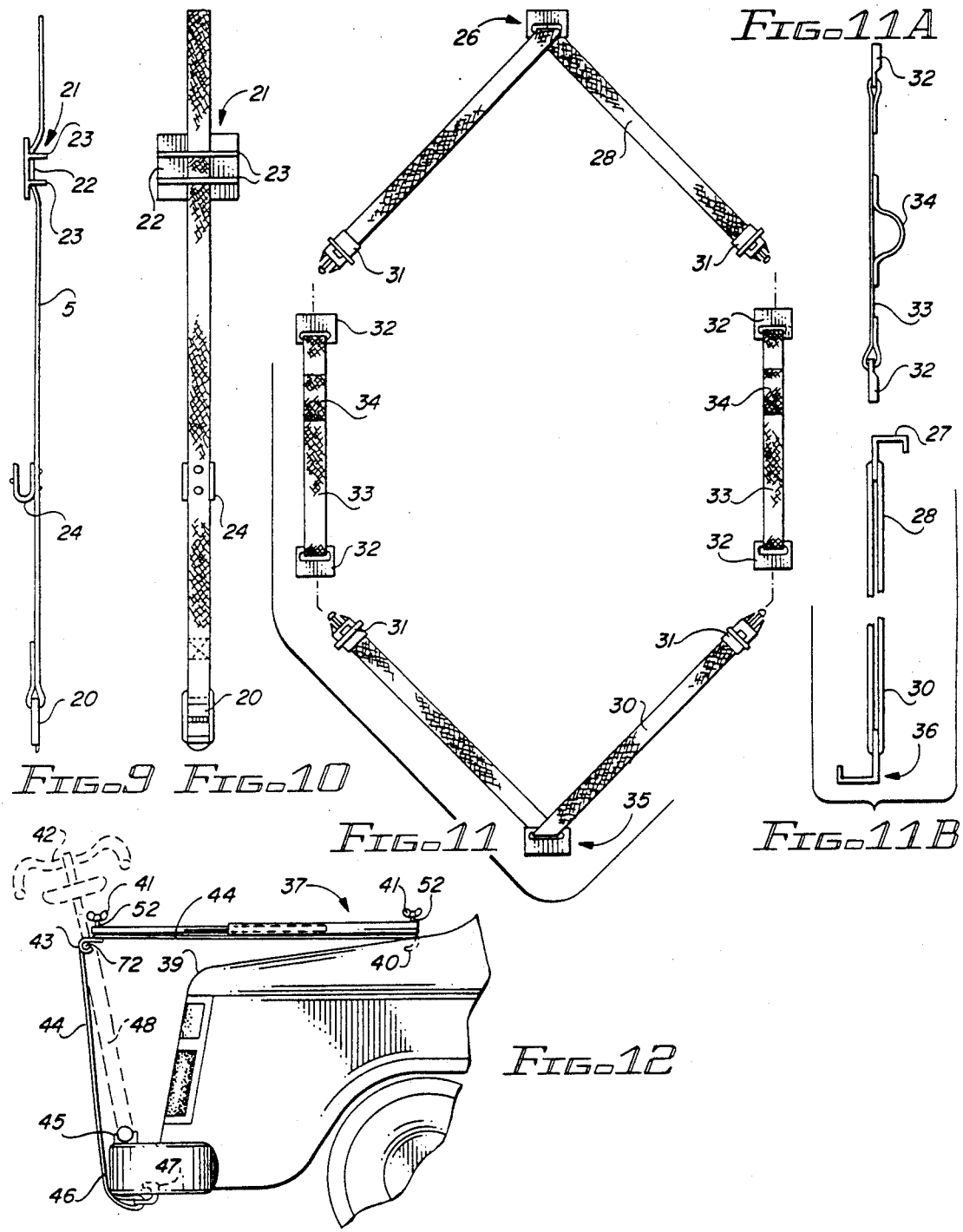

BICYCLE CARRIER FOR VEHICLES

This is a division of application Ser. No. 207,911 filed on Jun. 13, 1988, now U.S. Pat. No. 5,038,980 which is a continuation of prior application Ser. No. 06/902,978 filed on Sep. 2, 1986.

BACKGROUND OF THE INVENTION

This invention relates to bicycle carriers, particularly bicycle carriers for mounting bicycles or other lightweight two wheeled vehicle on the rear or even the front of an automobile or other four-wheeled vehicle.

There are numerous patents for apparatuses designed for mounting and carrying bicycles on automobiles. However, such bike racks and those currently on the market will work on one type of automobile or another but generally are not adaptable to all vehicles with four wheels as is the instant invention.

Some devices carry bicycles on top of a vehicle, such as U.S. Pat. No. 4,524,893 by Cole. Top bicycle carriers are difficult to mount and dismount a bicycle and create substantial wind drag for the vehicle. Other carriers are designed for mounting bicycles or motorcycles on the front or back of the automobile, such as those contained in U.S. Pat. Nos. 3,464,608 by Rodriquez; 2,431,400 by Iverson; 3,670,935 by Hinkston; 3,275,206 by Croft; 4,322,337 by Kosecoff; 3,993,229 by Summers; and PCT W080/01895. However, for the most part these bicycle carriers are cumbersome and can neither be stored nor carried easily by the biker, are difficult to install, and cause damage to the vehicles.

Other attempts have been made to overcome the problems associated with the above referenced patented inventions, including U.S. Pat. No. 3,923,221 by Ballinger which employs cable-like cords to attach the bicycle to the vehicle. However, the Ballinger device does not hold the bicycle firmly in place away from the vehicle but rather allows it to rub against the vehicle bumper, thereby scratching and damaging the paint and bumper of the vehicle and the bicycle. Furthermore, since the bicycle wheels do not rest on the the bumper the Ballinger device may not be used for carrying heavy bicycles or motorcycles because there is nothing firmly supporting the weight of the bicycle.

All of the above referenced problems are resolved by the instant invention in its various embodiments described hereinafter. The instant invention also provides numerous advantages over the prior art. It is economical by use of only straps and buckles contrary to most bicycle carriers which require several feet of metal tubing. Also the invention eliminates damage caused by rubbing or banging of the carrier or bicycle against the vehicle because a nonabrasive fabric protects the vehicle and straps hold the bicycle safely away from the vehicle. Moreover the instant invention is lightweight, collapsible and easy to carry since it consists of a set of straps without cumbersome metal frames. Thus, the device does not take up any space and can be stored easily in a knapsack, trunk, garage or basement. Even furthermore, the invention is easy to use because it can be carried by the bicyclist himself and used with any four wheel vehicle. Thus, a bicyclist away from home does not need to rely on the vehicle owner having a bicycle carrier stored in his trunk.

The instant invention is also self-supporting in that by holding the bicycle in compression, no external rack is needed.

Therefore, in manner briefly described above the instant invention provides numerous advantages not available in any of the prior art devices, among which are that it is economical, light weight, easy to use and store, self supporting, portable and eliminates the damage often caused by bicycle carriers currently available on the market.

SUMMARY OF THE INVENTION

The present invention has numerous objects.

A primary object of the invention is to provide a bicycle carrier which is portable and can be carried by the biker, himself.

A corollary object of the invention is to provide a bicycle carrier which is collapsible, so that it is easy to store and use.

An even further object of the invention is to provide a bicycle carrier which is light weight.

Another object of the invention is to provide a bicycle carrier which does not need an external rack to hold the bicycle to the vehicle.

An important object of this invention is to provide a bicycle carrier which eliminates the damage often associated with currently available bicycle carriers.

A general object of the invention is to meet all of the above objects and still be economical.

The instant invention accomplishes all of the above and other objects by providing a bicycle carrier consisting of primarily straps, except in one embodiment wherein a telescoping rod is also employed. All the embodiments use essentially five straps. One embodiment, hereinafter sometimes referred to as the "single strap embodiment," comprises an adjustable single strap which is attached at the top to the trunk by a hooked buckle and at the bottom to the bumper by a similarly hooked buckle. The central portion of this single strap contains a loop made of a hook and pile fastening material similar to VELCRO which wraps around the bicycle crossbar. Alternately, the central detachable portion of this single strap may have loops sewn into it through which it is looped through itself to fasten to the crossbars, handle bar stem or seat post of one or more bicycles. For securing more than one bicycle, additional loops may be attached to the central portion of the strap. One additional strap wraps around the inside of both wheels to hold the wheels in place. A third strap wraps around the brake lever and handle grip to further insure the bicycle wheels cannot move by locking the brake on. Finally, two straps wrap around the bumper and contain a loop with snaps or hook and pile fastening material such as VELCRO which wraps around the tires and holds the tires in place on the bumpers.

A minor addition to the single strap embodiment is necessary for use with bicycles which do not have a crossbar, such as the ordinary female bicycle. For such bicycles, two many straps rather than a single strap are positioned so that the straps is fastened to the handle bar stem and the other to the seat post rather than the crossbar.

A second embodiment, hereinafter sometimes referred to as the "V-strap embodiment" uses two V-straps in place of a single main strap embodiment. In this second embodiment, the closed end of one V-strap is attached to the trunk and the closed end of the other V-strap to the bumper by buckle hooks. The open ends of both main straps attach to the seat post and the handle bar stem by loops of hook and pile material or by loop actually sewn into the main strap ends. Alternately, these open ends of the main straps may attach by adjustable quick release buckles to somewhat shorter straps, one of these shorter straps having been looped around or otherwise attached to the handle bar stem area and the other to the seat post area.

A third embodiment of the present invention utilizes a telescoping rod in addition to the straps. In this embodiment a telescoping rod takes the place of the main strap between the trunk and the crossbar to which it is attached by means of a metal and rubber loop. From the crossbar a strap attaches to the telescoping rod and is hooked to the bottom of the bumper. The remaining straps used in the other embodiments, specifically the wheel strap, brake strap, and bumper straps are still utilized in this embodiment.

Since the above embodiments require the use of bumper straps which are designed for vehicles having a space between the bumper and the body of the vehicle, another type of bumper strap consisting of a rubber piece which attaches by fastener to the bottom of the tires is provided so the bicycle tires are held firmly in place without the need for bumper straps.

Thus, in summary, the instant invention provides three embodiments which all meet the objects of this invention. The foregoing, together with other objects of the present invention will become more readily apparent after consideration of the detailed description and the accompanied drawings of the invention.

BRIEF DESCRIPTION OF THE DRAWINGS

In the description hereinbelow, reference will be made to the appended sheets of drawings in which:

FIG. 2 is an exploded plan view of the single main strap;

FIG. 3 is a side view of one embodiment of the central portion of the main strap with loops sewn into the strap itself;

FIG. 4 is a side view of the central portion of the main strap with crossbar loops open;

FIG. 5 is a plan view of the brake lever strap;

FIG. 6 is a plan view of the wheel strap;

FIG. 7 is a side view of one embodiment of the bumper straps;

FIG. 8 is a bottom view of the bumper straps of FIG. 7;

FIG. 9 is a side view of a second embodiment of the bumper straps;

FIG. 10 is a top view of the bumper straps of FIG. 9;

FIG. 11 is a composite exploded plan view of the main strap which is part of a second embodiment of the invention, hereinafter sometimes referred to as the "V-strap embodiment;"

FIG. 11A is a side view of the central portions of the V-strap embodiment of FIG. 11;

FIG. 11B is a side view showing the strap buckles;

FIG. 12 is a partial side view of a third embodiment of this invention, hereinafter sometimes referred to as the "telescoping rod embodiment;"

FIG. 13 is a side plan view of a tire bumper holder to be with vehicles on which bumper straps cannot be used;

FIG. 14 a top plan view of the strap used in the telescoping rod;

DETAILED DESCRIPTION OF THE PREFERRED EMBODIMENTS

Having described the invention in general terms hereinabove, the preferred embodiments of this invention will now be described in detail by reference to the drawings appended hereto as FIGS. 1A through 19.

Figure 1A:
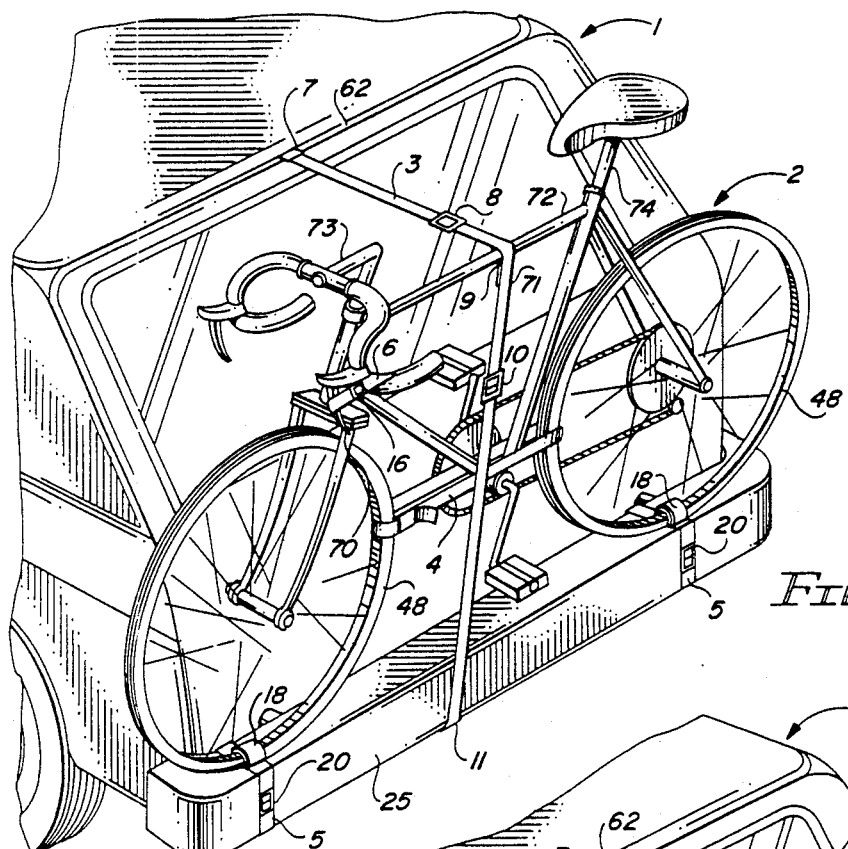
FIG. 1A is a perspective view of the bicycle carrier showing the single strap embodiment in place on a vehicle.
Figure 1B:
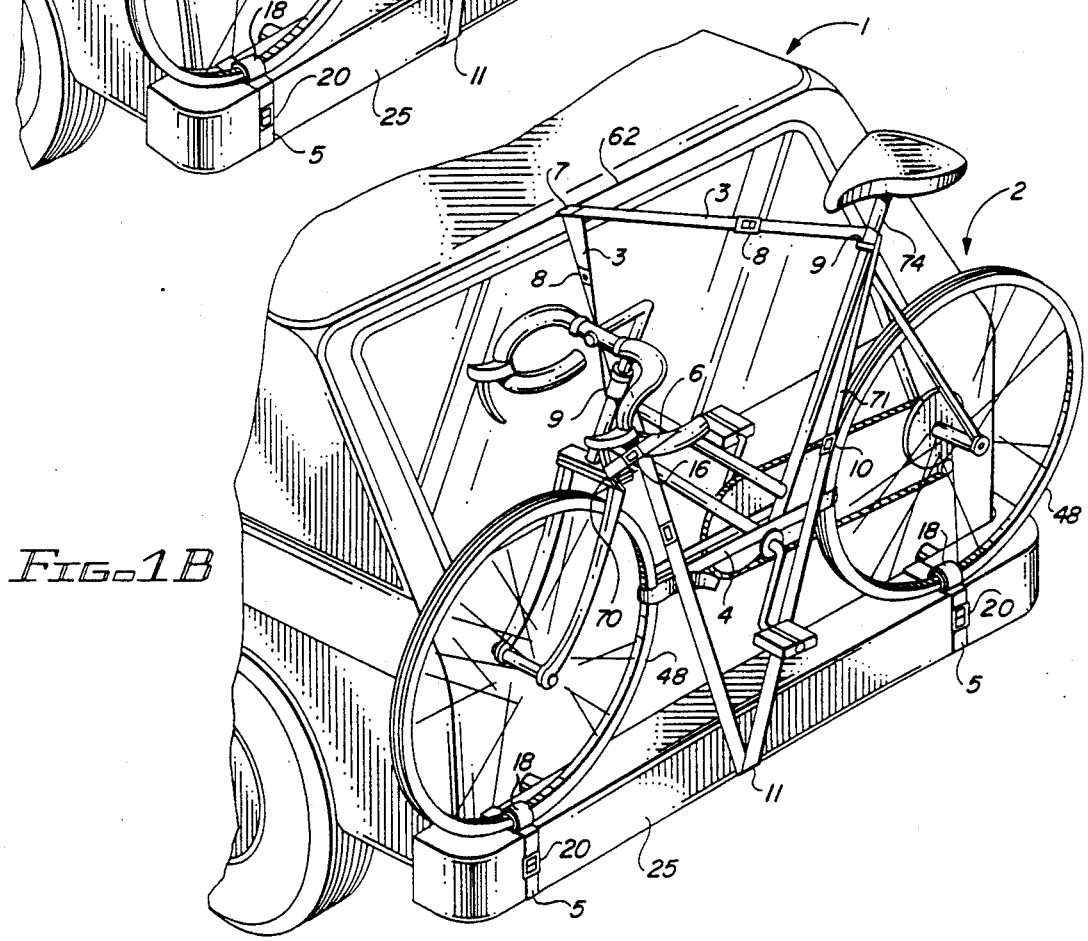
FIG. 1B is a perspective view of the bicycle carrier showing the V-strap embodiment in place of the vehicle.

FIG. 1A illustrates the preferred embodiment of the invention as it utilizes one main strap or cable 3 to secure a bicycle or light weight motorcycle 2 to a vehicle 1 and thus is hereinafter referred to as a "single-strap embodiment." FIG. 1B shows a second preferred embodiment which utilizes two straps in a "V" shaped fashion, thus sometimes hereinafter referred to as the "V-strap embodiment." Before discussing these emodiments depicted by 3 in FIGS. 1A and 1B, it is necessary to discuss the other components of the invention consisting of the bumper straps 5, wheel straps 4 and brake strap 6.

The bumper straps 5, provided by this invention are of two types, the first type, as shown in FIGS. 7 through 10, is designed for use on vehicles which have a space between the bumper and vehicle body as contemplated in the vehicle of FIG. 1A. The second type as shown in FIG. 12 for use when there are no spaces between the vehicle body and bumper so straps could not be inserted. This second type also shown in FIG. 13 and will be discussed later in this description.

The first type of bumper strap has two embodiments, one shown in FIGS. 7 and 8 and the other in FIGS. 9 and 10. The embodiment of FIGS. 7 and 8 may be made of cloth or nylon having an adjustable buckle 20 at one end through which the other end is passed and the bumper straps 5 pulled to secure it in a position where the bicycle wheel loops 18 are on top of the bumper 25. These bicycle wheel loops 18 may consist of hook and pile material, such as VELCRO, which wrap around the tire rim 48 to secure it in place. The loop 18 may also use snaps or some other fastening means instead of VELCRO to secure the bicycle wheels 48. Furthermore, these loops 18 are made long enough to fit around multiple tires so that more than one bicycle may be carried at the same time. On the bottom of the bumper strap 5 are ridged gripping surfaces 19 which may be made of rubber or similar material to prevent slippage of the bumper strap 5.

In the second embodiment of the bumper strap 5 illustrated in FIGS. 9 and 10, the bicycle wheel securing loops 18 replaced by short extruded pieces 21, preferably made of metal or plastic, containing two ridges 23 between which rest the bicycle wheels 48. In addition to having the locking buckle 20 to secure and tighten the bumper straps 5 this embodiment of the bumper straps 5 uses a U-shaped hook 24 to hook on the bottom edge of the bumper 25 to prevent the strap 5 from slipping in lieu of the ridged gripping surface 19 of the alternate bumper strap embodiment.

The next component of the invention which may be used with all embodiments of the invention is the wheel strap 4, which contains a locking adjustable buckle 17 or equivalent at one end of the wheel strap 4 of which is run through the inner side of both wheels 48, as shown in FIG. 1A to hold both wheels 48 parallel to the rear of the vehicle to keep the bicycle wheels 48 from rotating during carriage.

The next subcomponent of this invention which, like the wheel strap may be used with every embodiment of the invention, is the brake lever strap 6, shown in FIG. 5 of the drawings. This strap is similar to the wheel strap 4, except that it is shorter. This brake lever strap 6 is used to secure the bicycle brakes to keep the bicycle from moving. Alternately, the brake lever strap 6 could be placed around the brake calipers instead of the brake lever and handle bar grips.

Having now described the subcomponents of this invention two of which, the wheel strap 4 and the brake lever strap 6, may be used with all embodiments of the invention, the single main strap of the first embodiment depicted in FIGS. 2, 3 and 4 of the drawings will be discussed.

Like the other straps, the main strap 3 may be made of cloth or elastic material. This strap 3 is attached to the trunk lid 62, where it is fastened by inserting the L-shaped buckle with hook 7 and runs to the bumper 25 where it is secured by another L-shaped buckle with hook 11. As shown in FIG. 2, the preferred embodiment of the main strap 3 contains a detachable central portion 71 which is secured to the outer portions by two quick release buckles 8 and 10.

The female ends 13 and 14 of the quick release buckles 8 and 10 are contained on the central portion 71, while the male 12 and 15 ends of the quick release buckles 8 and 10, are contained on the outer portions. These male ends 12 and 15 provide means for adjusting the straps to fit any size of bicycle.

The means of securing the main strap 3 to the bicycle crossbar 72 is provided by the loops 9 shown in FIGS. 3 and 4. Such loops 9 may be formed by using hook and pile material such as VELCRO, snaps, zippers or by other fastening means such as the short central straps looping through themselves by means of loops 9 sewn into the straps 11. Carrying multiple bicycles could be provided for by the central portion 71 having more than one VELCRO loop or by the addition of another central portion which would have a male and a female end instead of the two female ends.

Having discussed all of the components of the single strap embodiment shown in FIG. 1A it is important to discuss the procedure for installing this bicycle carrier which applies to all the embodiments of the invention. First, the bumper straps 5 are secured in the proper position around the bumper 25 of the vehicle 1. The wheel straps 4 and brake lever straps 6 can be fastened on the bicycle beforehand then, the bicycle wheels 48 are placed on the bumper 25 into the bicycle wheel securing the loops 18 which are folded over and between the spokes of the wheels 48. Next, the main strap 3 is hooked by the buckle 7 to the top of the trunk 62 and over the crossbar 72 to which it is secured by the crossbar loops 9, and then to the bumper 25 by the bumper hook 11. Finally, the strap is tightened at the quick release buckles 8 and 10 to hold the bicycle in a secure position away from the vehicle 2 so as not to rub or scratch the vehicle 1 during transportion. Thus the bicycle is self-supporting and does not require the use of rigid frames or rods to hold it, as do most other bicycle carriers.

In order to use this first embodiment to carry bicycles which have no crossbars, such as female bicycles, another strap of the same construction is added. These two straps are positioned apart so that one strap runs from the trunk 62 to the handle bar stem 73 to which it is fastened by the looped fastener 9 to the bumper 25, and the other strap from the trunk 62 to the seat post 74 to which it is fastened by the looped fastener 9 and then to the bumper 25. Thus, merely by adding another main strap this embodiment can be used on male or female bicycles.

The second embodiment of the invention illustrated in FIG. 1B utilizes two V-straps 28 and 30 as shown in FIG. 11 rather than a main single strap 3. Unlike the single strap embodiment, this V-strap embodiment can be used with male or female bicycles which have no crossbar without the need for additional straps. Inasmuch as this is the only difference between the single strap embodiment and the V-strap embodiment, the application of the V-strap is not shown in full perspective as was the single strap embodiment in FIG. 1. Referring to FIG. 11, the V-strap is shown to consist of a top and bottom strap 28 and 30, respectively, which are secured in the middle by L-shaped hooks 27 and 36 to the top of the trunk lid 62 and to the bottom of the bumper 25. From the bracket hooks 26 and 35 each strap extends outwardly in a V-shape to a central strap portion 33. One central strap wraps around the handle bar stem 73 and the other around the bicycle seat post 74 to hold the bicycle in place.

In order to make the V-straps 28 and 30 adjustable to fit various size of bicycles, the central portions of the straps and the quick release buttons consisting of a male part 31 and a female part 32, the male part of which 31 allows for strap adjustment. As with the fastening means of the single strap embodiment, the V-strap embodiment has one or more loop fastening means 34 formed by folding over two pieces of VELCRO-like material or snapping two overlapping pieces of material to each other with snaps. Alternately, the central portion 29 can loop through itself to fasten around either the seat post 74 or the handle bar stem 73.

The third embodiment of this invention utilizes a slightly different means of attaching or securing the bicycle body in place on a vehicle than the first two embodiments. Rather than utilizing all straps as do the other embodiments of the invention, this third embodiment uses a combination of a telescoping rod 37 and a strap 44 as the principal component as shown in the partial side view of FIG. 12.

The telescoping rod 37 is secured at the top of the trunk 39 and extends outward to the bicycle crossbar 72 where it is secured in place by ring 43. From the bicycle crossbar 72 to the bumper 25 runs a strap 44 which is secured by a lip hook 47 to the bottom lip of the vehicle bumper 46.

Figure 15:
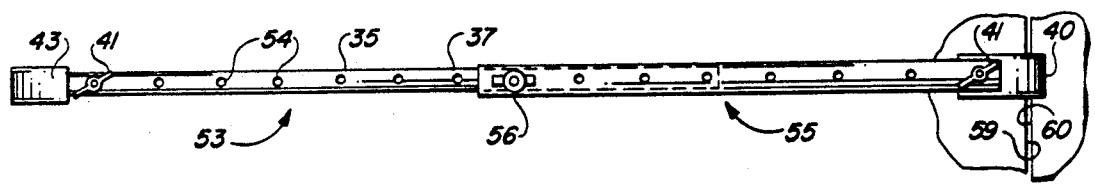
FIG. 15 is a top plan view of the telescoping rod.
Figure 16:
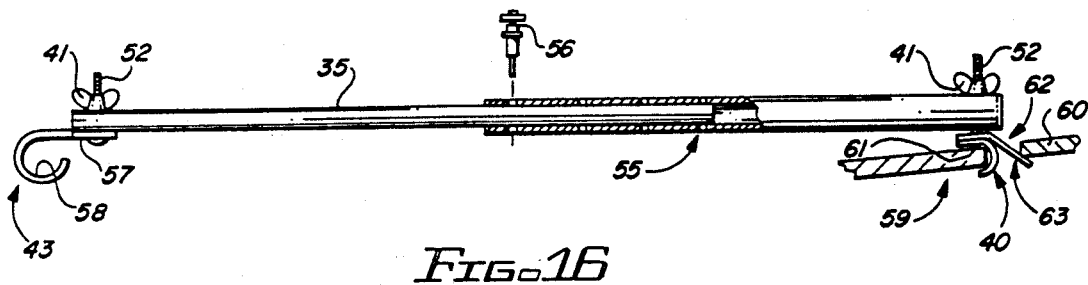
FIG. 16 is a side plan view of the telescoping rod.
Figure 17:
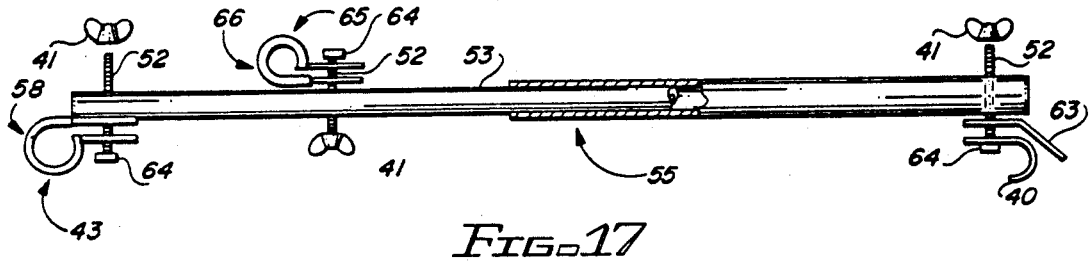
FIG. 17 is a side plan view of the telescoping rod designed for holding two bicycles.
Figure 18:
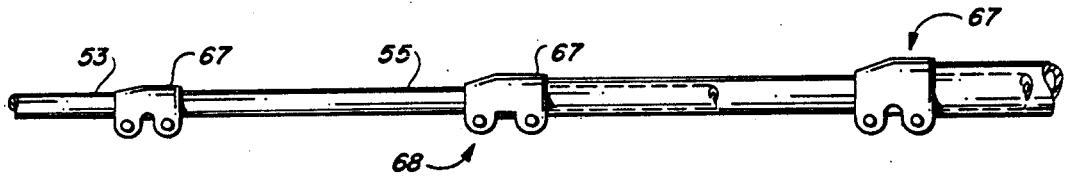
FIG. 18 is a segmented side plan view of a variation of the telescoping rod.
Figure 19:
FIG. 19 is a segmented side plan view of another variation of the telescoping rod.

FIGS. 15 and 16, show the trunk fastening means of the telescoping rod 37 in detail. The fastening means consists of a bolt 52 which runs through a hole on top of the telescoping rod having a round bottom 61 which may have tape over it or rubber coating to prevent scratching of the trunk lid 59, a hook 40 which is similar to those hooks used for car top racks and other vehicles and an obtusely angled flat piece 63 of metal or plastic that fits in the slot 62 between the trunk lid 59 and car body 60. A wing nut 41 is used to tighten the bolt 52 which also secures it in place as depicted in FIG. 15. The telescoping rod 37 itself consists of an outer tube 55 and an inner tube 53 both of which contains holes 54 spaced in the same intervals throughout. This telescoping rod 37 is adjustable by sliding the inner tube 53 to desired position and then inserting a quick release pin 56 with the holes 54 adjacent in both tubes. At the bicycle crossbar 72 and the telescoping rod 37 is a similar wing nut 41 and bolt 52 which holds in place an outer metal ring 57 with inner rubber ring 43 and in the center of which 58 the bicycle crossbar 74 is secured. Upon tightening the lock wing 41 the inner rubber ring 43 secures the crossbar 74 in place. It should be noted that the telescoping rod 37 may have various variations as shown in FIGS. 17, 18 and 19. For example, FIG. 17 shows the telescoping rod holding two bicycles having a second metal and rubber ring combination 66 and 65 in front of and similar to the outer ring 57. FIG. 18 shows another variation which utilizes, instead of a release pin 56, dual sized clamps 67 as the means of securing the outer tube 55 and the inner tube 53 together. These dual size clamps 67 contain at the small end a lever 68 for tightening. An even further embodiment of the telescoping rod in FIG. 19 illustrates another means of securing the outer 55 and inner 53 rods together by use of narrow threaded collars 69 which are twisted around threads at the ends of each larger outer tube 55 to secure the telescoping rod 37 at the desired length.

Returning now to FIGS. 12 and 14, the other element of the telescoping rod embodiment, the strap 44, is discussed in detail. The strap 44, is secured to the bolt 52 of the telescoping rod 37 at the bicycle crossbar 72 by said bolt 52 through the grommet 51 on the end of the strap 44. A bumper lip hook 47 is used to attach the strap 44 to the vehicle bumper 46. This strap 44 can be adjusted to secure the bicycle tightly in place by the adjusting buckle 50.

As mentioned earlier, the first type of bumper straps 5 dicussed hereinabove cannot be used on vehicle bumpers which do not have a space between the bumper and the body of the vehicle. Accordingly, the instant invention provides another means of holding the bicycle wheel 48 in place as is illustrated in FIGS. 12 and 13. FIG. 12 shows the holder 45 on a bumper 46 having no space between said bumper 46 and car body 38. This holder 45 consists of a half curved tube, which can be made of rubber or other pliable material that fits around the bottom of the bicycle wheel 48 between the bumper 46 and tire 48. This holder 45 may be better secured if necessary on the bicycle wheel 48 by fasteners 49, made of VELCRO or other material, if necessary. Rather than a simple holder 45 for vehicles having no space between body and bumper, a holder which could hold multiple bicycles may be designed consisting of a flat plate of metal or plastic with non-skid rubber cushion resting on the bumper and a cushioned front tip which could rest against the car body.

Thus, we have described in detail the instant bicycle carrier, which in its one or more embodiments, offers numerous advantages over prior bicycle carriers which have been patented or which are available in the current market. Among these advantages are that this invention is light weight and not cumbersome like prior metal frames because it consists primarily of straps. The invention is easily storable in that it does not take much space and even may be carried in a small sack by the bicyclist himself. A further advantage is that the instant invention eliminates damage caused by rubbing or banging of the bicycle against the vehicle as is often the case with prior bicycle carriers. An even further advantage is that the instant invention is very easily and quickly used and does not require tools such as wrenches and screw drivers for assembly. And most of all, the instant invention while offering all the above advantages, is economical because it is made and consists mostly of a series of straps and buckles as opposed to prior bicycle carriers which for the most part require several feet of metal tubing in their construction.

While several specific embodiments of the invention have been described in detail above, it is to be understood that various modifications may be made from the specific details described herein without departing from the spirit and scope of the invention as described in the claims.

I claim the following:

1. A bicycle or lightweight motorcycle carrier for removable attachment to the rear of a vehicle comprising:
    a means of securing a bicycle body in a desired position consisting of an adjustable telescopic rod-like extension with fastening means for attachment to a trunk at one end and means of attachment to a crossbar of a bicycle or bicycles at the other end and further having a strap which attaches to said crossbar end of said telescoping rod and to the bottom of the vehicle bumper or other vehicle body part; and
    a pair of adjustable straps that fit around a vehicle bumper having gripping means on the inside thereof and bicycle wheel securing means on the topside thereof.

2. The carrier of claim 1 in which the bicycle wheel securing means on the pair of adjustable straps consists of two pieces of material which overlap to wrap around the bicycle wheel and which secured together by use of hook and pile material, snaps or other similar means.

3. The carrier of claim 1 having a strap which wraps around both bicycle wheels or one bicycle wheel and a bicycle frame member in order to prevent rotation of the bicycle wheels while the bicycle is attached to the vehicle.

4. The carrier of claim 1 having strap securing means which wraps around a brake lever and handle bar grip or brake calipers in order to further prevent the rotation of the bicycle wheels while a bicycle is attached to the vehicle.

5. The carrier of claim 1 in which the bicycle wheel securing means on the pair of adjustable straps consists of a short flat piece containing raised ridges between while the bicycle wheels rest.

6. The carrier of claim 1 in which the bicycle wheel securing means on the pair of adjustable straps consists of a short flat piece containing raised ridges between which the bicycle wheels rest and in which the gripping means consists of a U-shaped clamp that fits around the vehicle bumper edge to keep the strap from sliding on the vehicle bumper.

7. The carrier of claim 1 wherein the telescopic rod-like extension in which the fastening means of attachment to the truck or hood lid of the vehicle consists of a flat piece with rounded hook at the outer end, an obtusely angled piece on the top of said hook through both of which passes a bolt and a wing nut on top of the telescoping rod for tightening around the bolt to hold the hook of the flat piece securely in the space between the trunk and vehicle body.

8. The carrier of claim 1 wherein the means of attaching the telescoping rod to the bicycle crossbar consists of one or more metal rings with inner rubber rings attached to the telescoping rod by a bolt said rings which are enclosed around the crossbar and secured by tightening a wing nut on the top of said bolt.

9. The carrier of claim 1 in which the means of attaching the strap to the telescoping rod and to the bumper consists of a grommet at the upper end through which the bolt from the telescoping rod can be inserted and to the bumper or other vehicle body part at the lower end of the strap by a hooked buckle.

10. The carrier of claim 1 wherein the telescoping rod consists of two tubes, a smaller inner tube with holes which slides in and out of a larger outer tube with similarly placed holes, both tubes being secured at the adjusted desired length by a quick release pin placed through said holes.

11. The carrier of claim 1 wherein the telescoping rod-like extension consists of two tubes, a smaller inner tube which slides in the and out of a larger outer tube which is adjustable lengthwise by extending the inner tube to the desired length and turning a knurled threaded collar on the outer end of the larger tube to secure the extension at the desired length.

12. The carrier of claim 1 wherein the telescoping rod-like extension consists of two tubes, a smaller inner tube which slides in and out of a larger outer tube which is adjustable lengthwise by extending the inner tube the desired length and securing dual size clamps on the outer end of the tube by tightening levers on said clamps.

13. A bicycle or lightweight motorcycle carrier for removable attachment to the rear of a vehicle comprising:
- a means of securing a bicycle body in a desired position consisting of an adjustable telescopic rod-like extension with fastening means for attachment to a trunk at one end and means of attachment to a crossbar of a bicycle or bicycles at the other end and further having a strap which attaches to said crossbar end of said telescoping rod and to the bottom of the vehicle bumper or other vehicle body part;
- a pair of adjustable straps that fit around a vehicle bumper having gripping means on the inside thereof and bicycle wheel securing means on the topside thereof;
- a strap which wraps around both bicycle wheels or one bicycle wheel and a bicycle frame member in order to prevent rotation of the bicycle wheels while the bicycle is attached to the vehicle; and
- a strap which wraps around a bicycle brake lever and handle bar grips or brake calipers in order to prevent the rotation of the bicycle wheels while a bicycle is attached to the vehicle.

* * * * *